United States Patent
Jenny (10) Patent No.: US 9,221,424 B2
(45) Date of Patent: Dec. 29, 2015

(54) SAFETY BELT STRAP FOR ARRANGEMENT ON A VEHICLE SEAT OF A MOTOR VEHICLE

(71) Applicant: GM GLOBAL TECHNOLOGY OPERATIONS LLC, Detroit, MI (US)

(72) Inventor: Thomas Jenny, Alsbach-Haehnlein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/097,708

(22) Filed: Dec. 5, 2013

(65) Prior Publication Data

US 2014/0167400 A1 Jun. 19, 2014

(30) Foreign Application Priority Data

Dec. 5, 2012 (DE) .......................... 10 2012 023 778

(51) Int. Cl.
*B60R 22/00* (2006.01)
*B60R 22/12* (2006.01)
*B60R 22/195* (2006.01)

(52) U.S. Cl.
CPC .............. *B60R 22/12* (2013.01); *B60R 22/1955* (2013.01)

(58) Field of Classification Search
CPC .............. B60R 22/195; B60R 22/1952; B60R 22/1955; B60R 22/46; B60R 22/12
USPC ........ 280/801.1, 805, 806, 807; 297/470, 480
See application file for complete search history.

(56) References Cited

U.S. PATENT DOCUMENTS

| 5,765,869 | A | | 6/1998 | Huber | |
|---|---|---|---|---|---|
| 5,839,753 | A | | 11/1998 | Yaniv et al. | |
| 5,845,939 | A | * | 12/1998 | Greiner et al. | ................. 280/806 |
| 6,340,176 | B1 | * | 1/2002 | Webber et al. | ................. 280/806 |
| 6,572,147 | B2 | * | 6/2003 | Webber et al. | ................. 280/806 |
| 6,688,646 | B2 | * | 2/2004 | Specht et al. | ................. 280/805 |
| 6,808,207 | B2 | * | 10/2004 | Nakano et al. | ................. 280/806 |

(Continued)

FOREIGN PATENT DOCUMENTS

| DE | 10358314 A1 | 7/2005 |
|---|---|---|
| DE | 102009035049 A1 | 2/2011 |

(Continued)

OTHER PUBLICATIONS

GB Search Report dated Mar. 27, 2014 for GB Application No. 1318221.7.

(Continued)

*Primary Examiner* — Paul N Dickson
*Assistant Examiner* — Timothy Wilhelm
(74) *Attorney, Agent, or Firm* — Ingrassia Fisher & Lorenz PC (57) ABSTRACT

A safety belt strap is proposed for arrangement on a vehicle seat of a motor vehicle, with a belt tensioning section. The safety belt strap is able to be shortened via the belt tensioning section. The belt tensioning section has two marginal regions and a central region, which connects the two marginal regions, with a pyrotechnic tensioning device. The pyrotechnic tensioning device is in operative connection with the belt tensioning section such that after triggering of the pyrotechnic tensioning device the two marginal regions of the belt tensioning section are moved to one another independently of the central region, in order to shorten the safety belt strap.

18 Claims, 4 Drawing Sheets

(56) References Cited

U.S. PATENT DOCUMENTS

| | | | |
|---|---|---|---|
| 6,874,817 B2 * | 4/2005 | Nakayama et al. | 280/805 |
| 6,942,251 B2 * | 9/2005 | Birk et al. | 280/806 |
| 7,118,132 B2 * | 10/2006 | Terasaki | 280/806 |
| 7,147,251 B2 * | 12/2006 | Bell et al. | 280/806 |
| 7,350,734 B2 * | 4/2008 | Stevens | 242/374 |
| 7,380,832 B2 | 6/2008 | Gray et al. | |
| 7,862,081 B2 * | 1/2011 | Thomas | 280/733 |
| 8,317,228 B2 * | 11/2012 | Mages | 280/806 |

FOREIGN PATENT DOCUMENTS

| | | |
|---|---|---|
| EP | 0965670 A2 | 12/1999 |
| JP | 11348705 A | 12/1999 |
| WO | 9942022 A1 | 8/1999 |

OTHER PUBLICATIONS

German Patent Office, German Patent Search Report for Application No. 102012023778,2 dated Aug. 29, 2013.

\* cited by examiner

SAFETY BELT STRAP FOR ARRANGEMENT ON A VEHICLE SEAT OF A MOTOR VEHICLE

CROSS-REFERENCE TO RELATED APPLICATION

This application claims priority to German Patent Application No. 10 2012 023 778.2, filed Dec. 5, 2012, which is incorporated herein by reference in its entirety.

TECHNICAL FIELD

The technical field relates to a safety belt strap for arrangement on a vehicle seat of a motor vehicle.

BACKGROUND

Safety belts of the present-day standard often have a belt tensioning device for safety reasons. The belt tensioning device makes it possible to tension or respectively shorten the safety belt in the case of an accident, in order to decelerate the occupant at an early stage with the vehicle and to reduce the stresses acting upon him.

From DE 103 58 314 A1, which indeed constitutes the nearest prior art, a safety belt with an integrated belt airbag is known, wherein the belt airbag is arranged in a partial section of the safety belt and has a tubular braid. The tubular braid is designed such that the volume surrounded by the braid enlarges on the triggering of the belt airbag and consequently the belt airbag is shortened.

At least one object is to provide a safety belt strap with a belt tensioning function constructed in a space-saving manner. In addition, other objects, desirable features and characteristics will become apparent from the subsequent summary and detailed description, and the appended claims, taken in conjunction with the accompanying drawings and this background.

SUMMARY

A safety belt strap is provided for arrangement on a vehicle seat of a motor vehicle. For example, the safety belt strap is constructed as a two-point belt, four-point belt, five-point belt etc. The safety belt strap is constructed as a three-point belt, which in the state when being worn extends over the pelvis and the upper body region of a vehicle occupant. The far ends of the safety belt strap are able to be arranged e.g. on a side region of the vehicle seat and on a B-column of the motor vehicle.

The safety belt strap comprises a belt tensioning section. The safety belt strap is able to be shortened in longitudinal direction of the belt via the belt tensioning section. In a collision for example, the vehicle occupant is restrained at an early stage in the vehicle seat by the shortening of the applied safety belt strap. The belt tensioning section has two marginal regions and one central region, wherein the central region connects the two marginal regions in particular in a single piece. The percentage length proportion of the belt tensioning section to the total length of the safety belt strap corresponds for example to less than approximately 15%, in particular less than approximately 10%, especially less than approximately 5%. As an example alternative or optional addition, the belt tensioning section in longitudinal direction of the belt has a length of, e.g., approximately 20 cm, in particular less than approximately 10 cm, especially less than approximately 5 cm.

The safety belt strap has a pyrotechnic tensioning device. In particular, the pyrotechnic tensioning device has an igniter with a pyrotechnic propellant charge. The pyrotechnic propellant charge, on ignition, provides the necessary energy for shortening the safety belt strap. The ignition of the pyrotechnic propellant charge is controlled by a control unit of the motor vehicle, which is able to be connected with the pyrotechnic tensioning device. For example, the igniting of the pyrotechnic propellant charge takes place on the detection of a collision of the motor vehicle.

The pyrotechnic tensioning device is in operative connection with the belt tensioning section such that after triggering of the pyrotechnic tensioning device, in particular of the pyrotechnic propellant charge, the two marginal regions of the belt tensioning section are moved to one another independently of the central region, in order to shorten the safety belt strap. As the two marginal regions move towards one another, consequently the distance between the two marginal regions is reduced, and the reduction of the distance the safety belt strap is shortened in the longitudinal direction of the belt. Preferably, the distance between the two marginal regions reduces in longitudinal direction of the belt. In particular, for reduction of the distance between the two marginal regions, a tractive force is applied at least on one of the two marginal regions. T through the tractive force the marginal regions are moved towards one another. The tractive force is not introduced here through the central region or transferred with the central region. In particular, the tractive force is introduced in the longitudinal direction of the belt.

In view of the pyrotechnic tensioning device arranged on the safety belt strap, a direct and therefore a quick and reliable shortening of the safety belt strap is made possible. At least one further advantage is the embodiment, optimized with regard to installation space, in the motor vehicle, because the arrangement of the pyrotechnic tensioning device, e.g., on the belt buckle or on an end fitting parallel to a seat rail or as a curved tube in this region is omitted.

In an embodiment, the central region of the belt tensioning section after triggering of the pyrotechnic tensioning device, in particular of the pyrotechnic propellant charge, is slack in its form. The central region is therefore not under any tensile stress. In particular, the marginal regions exert a force onto the central region by moving towards one another, in which the central region is put under compressive stress. Through the compressive stress, an evasion of the central region takes place for example, wherein the evasion takes place for example by a buckling, gathering, rolling up, telescoping, socketing, folding, crushing or similar.

From the structural composition the pyrotechnic tensioning device has a traction device that is coupled with the belt tensioning section. After triggering of the pyrotechnic tensioning device, in particular of the pyrotechnic propellant charge, the traction device moves the two marginal regions of the belt tensioning section towards one another. Particularly preferably, the traction device one marginal region is drawn to the other marginal region. In particular, one of the marginal regions is at least almost fixed in relation to the other marginal region, so that on the drawing of the one marginal region traction device, the marginal regions are moved to one another. For example, the traction device for moving the two marginal regions to one another is coupled with at least one, particularly preferably with precisely one of the two marginal regions. The movement of the traction device and of the two marginal regions to one another preferably takes place synchronously. In particular, the traction device and the at least one marginal region have a transmission ratio of 1:1. For example, the traction device is constructed as a traction band or as a traction cable.

It is preferred that the pyrotechnic tensioning device comprises a propelling body, which is coupled with the traction device, wherein the propelling body is displaced by the triggering of the pyrotechnic propellant charge. In particular, the propelling body, on its displacement, exerts a tractive force on the traction device, so that the traction device is preferably drawn in the longitudinal direction of the belt. By means of the tractive force, the two marginal regions of the belt tensioning section are moved to one another and therefore the safety belt strap is shortened. In particular, the propelling body, the traction device and/or at least one of the marginal regions is moved in the longitudinal direction of the belt. The propelling body is constructed e.g., as a ball or as a roller.

According to an embodiment, the pyrotechnic tensioning device has a chamber with a guide duct. After triggering of the pyrotechnic propellant charge, propellant gas is guided into the guide duct and the propelling body is arranged displaceably. Preferably, the guide duct extends in the longitudinal direction of the belt. Through the triggering of the pyrotechnic propellant charge with the propellant gas in the guide duct a gas pressure is exerted onto the propelling body, so that the latter is displaced along the guide duct. The kinetic energy of the propelling body is transferred by the traction device to the belt tensioning section, in particular to at least one of the marginal regions, so that the two marginal regions of the belt tensioning section are moved to one another.

In an embodiment, one of the two marginal regions is connected with a belt strap section of the safety belt and the additional marginal region is connected with the chamber. In particular, the two marginal regions are arranged lying opposite one another. Preferably, the traction device is arranged on the marginal region that is facing away from the chamber. On the displacement of the propelling body, the marginal region that is facing away from the chamber and is connected with the traction device also moves. The marginal region that is arranged at the chamber and arranged so as to be stationary. In this way, the distance between the two marginal regions and consequently the total length of the safety belt strap is reduced.

Furthermore, it is possible that the chamber has an air vent that is connected fluidically with the guide duct and permits the escape of the air which is driven off by the displaced propelling body. As an example alternative, provision can be made to construct an end region of the guide duct elastically, which deforms elastically by the air which is driven off by the propelling body. An excess pressure in the chamber, which would brake or even prevent the displacement of the propelling body, is avoided in this way.

An embodiment is characterized in that the chamber is formed from a safety belt material. In particular, the safety belt material forms the guide duct and/or the walls of the chamber. The safety belt material is distinguished in particular by its high degree of robustness, in particular by its tensile strength. Consequently the chamber made of the safety belt material withstands extreme types of stress, in particular the forces occurring in an accident and/or the gas pressures or respectively gas temperatures during the combustion of the pyrotechnic propellant charge. Costly retaining and/or securing elements, e.g., for the arrangement of the propelling body, are therefore not necessary, which reduces the production expenditure and achieves a favorably priced type of construction. In addition, the chamber made from the safety belt material achieves a light and space-saving embodiment, so that there is no intrusive contour on the safety belt strap which is noticeable to the vehicle occupant. It is, however, to construct the chamber, e.g., as a tube which is integrated in the safety belt strap.

The tube is manufactured for example from a metal or a plastic. The plastic can be constructed reinforced with glass fiber. The chamber is formed by a double-layered arrangement of the safety belt material. To provide the guide duct, the material surfaces are preferably connected in a force-fitting and/or form-fitting manner. For example, the material surfaces are sewn together, stapled, riveted and/or glued. Alternatively or optionally in addition a silicone coating can be arranged on the inner and/or outer region of the guide duct. A gas-tight or at least approximately gas-tight chamber is realized in this way. A particular advantage in the double-layered arrangement of the safety belt material is the particularly stable construction, so that the guidance of the propelling body in the guide duct is ensured.

In an embodiment, the chamber has reinforcing inserts. In particular, the reinforcing inserts are arranged on the longitudinal sides of the chamber running in the longitudinal direction of the belt. If the chamber is not made from a buckling-resistant material or from a slightly buckling-resistant material, the reinforcing inserts ensure the stability of the chamber and/or of the guide duct in longitudinal and/or transverse direction. The reinforcing inserts are constructed, e.g., as a sheet metal part or as a plastic part. For example, the reinforcing inserts can be sewn into the longitudinal sides of the chamber. Furthermore, at least one of the reinforcing inserts can be constructed as a guide track for an ignition plug cable, which serves for the current supply of the igniter. A permanent bending stress, in particular a buckling of the igniter plug cable, which could result in a cable break and consequently no igniting of the igniter, is reduced in this way.

In a further embodiment, the belt tensioning section is formed from the safety belt material. Advantageously, the belt tensioning section made from the safety belt material withstands extreme types of stress, in particular the forces occurring in an accident. Particularly preferably, the belt tensioning section is formed by a double-layered arrangement of the safety belt material. In the double-layered arrangement the traction device is interposed. The stable construction of the safety belt material ensures the guidance movement of the traction device in the belt tensioning section. In addition, a direct access to the traction device, e.g., by a vehicle occupant or an object, is prevented. In this way, a blocking effect of the traction device is avoided.

It is possible to limit the shortening of the safety belt strap. For example, the limiting takes place by a contacting of the two marginal regions that have reached the minimum distance from one another on contacting. Alternatively or optionally in addition the limiting takes place by an end region of the guide duct, which can form an end stop for the displaced propelling body.

The traction device has a catch mechanism that after a predetermined length of shortening of the safety belt strap preferably catches with one of the marginal regions. For example, the catch mechanism is constructed as at least one barbed hook, which after the predetermined length of shortening of the safety belt strap is, e.g., guided through in a guide section of the marginal region and catches therewith. In this way, a backward movement of the traction device is avoided and consequently a restraining of the vehicle occupant is also ensured after a pressure drop in the guide duct.

With regard to the structural composition, one of the marginal regions has a coupling element. The chamber and the belt tensioning section are connected via the coupling element, and the chamber is supported via the coupling element.

In particular, the coupling element is arranged on one of the marginal regions of the belt tensioning section. The supporting of the chamber enables, on displacing of the propelling body, the transmission of the kinetic energy from the traction device to the belt tensioning section. When the traction device is arranged on the marginal region facing away from the chamber, the coupling element preferably has a guide section, via which the traction device is guided. For example, the igniter with the pyrotechnic propellant charge is arranged in the coupling element. The coupling element is manufactured for example from a metal, plastic or from a textile.

An embodiment makes provision that one of the marginal regions has a retaining element. The belt tensioning section is connected via the retaining element with the belt strap section of the safety belt strap. Therefore the retaining means is constructed in particular to connect the belt tensioning section securely with the belt strap section. In particular, the retaining element is arranged on the marginal region which faces away from the coupling element. The retaining element is manufactured for example from a metal, plastic or a textile. For example, a free end of the traction device is arranged on the retaining element.

In an embodiment, the safety belt strap has a fastening device that is constructed for example as a belt buckle tongue and is able to be arranged on a belt buckle. However, owing to the direct arrangement of the pyrotechnic tensioning device on the safety belt strap, the belt buckle is not required for the storage of the pyrotechnic tensioning device. Therefore, it is alternatively possible not to provide a belt buckle, and to arrange the fastening device, e.g., directly on the vehicle seat or on a B-column base point or on a floor plate of the motor vehicle.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
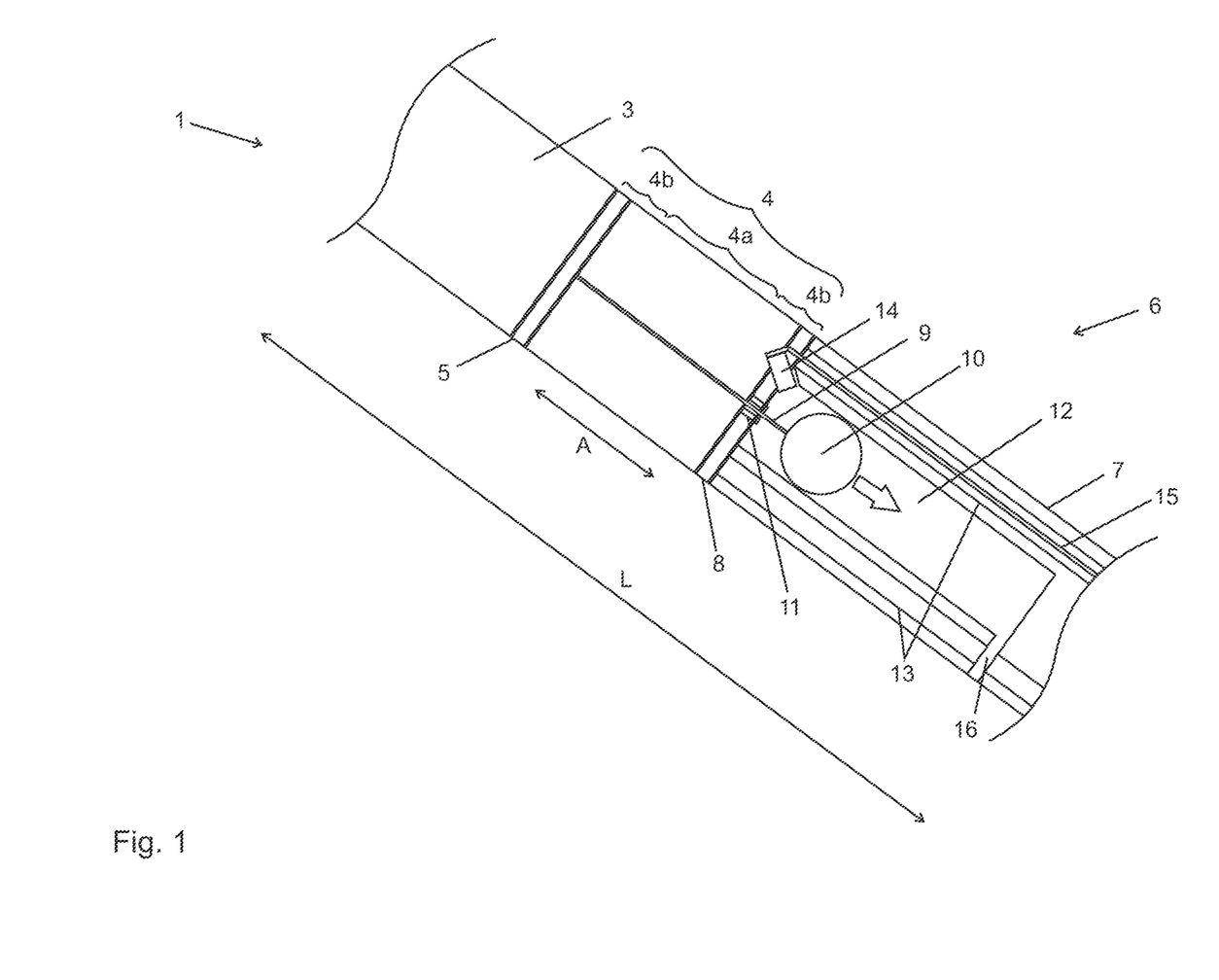
FIG. 1 is a cutout of a safety belt strap as an embodiment.

FIG. 1 shows a cutout of a safety belt strap 1 as an embodiment. The safety belt strap 1 is able to be arranged on a vehicle seat 2 (FIGS. 3 and FIG. 4) of a motor vehicle and serves for restraining a vehicle occupant in the vehicle seat 2 for example in the case of a collision. The safety belt strap 1 is constructed, e.g., as a three-point belt.

The safety belt strap 1 comprises a belt strap section 3 which, when the safety belt strap 1 is in the state of being worn, restrains the vehicle occupant on the vehicle seat 2. In addition, the safety belt strap 1 comprises a belt tensioning section 4, which is connected with the belt strap section 3. The safety belt strap 1 is able to be shortened via the belt tensioning section 4 in the belt longitudinal direction L. The shortening of the safety belt strap 1 makes it possible e.g. in the case of a collision of the motor vehicle, to hold the vehicle occupant at an early stage in the vehicle seat 2. The belt tensioning section 4 has a central region 4a and two marginal regions 4b, wherein the two marginal regions 4b are connected with one another via the central region 4a. The belt tensioning section 4 is manufactured from a double-layered safety belt material. However, to illustrate the inner region of the belt tensioning section 4, the upper of the two layers, from the view of FIG. 1, is not illustrated.

One of the two marginal regions 4b has a retaining element 5. The marginal region 4b is connected via the retaining element 5 with the belt strap section 3 of the safety belt strap 1. The retaining element 5 is constructed e.g. as a sheet metal part, on which the belt strap section 3 is mounted, e.g., in a form-fitting and/or materially connected manner.

The safety belt strap 1 comprises a pyrotechnic tensioning device 6. The pyrotechnic tensioning device 6 is constructed to move the two marginal regions 4b, which are spaced apart from one another, to one another, so that a distance A between the two marginal regions 4b is reduced and therefore the safety belt strap 1 is shortened in the belt longitudinal direction L.

Figure 4:
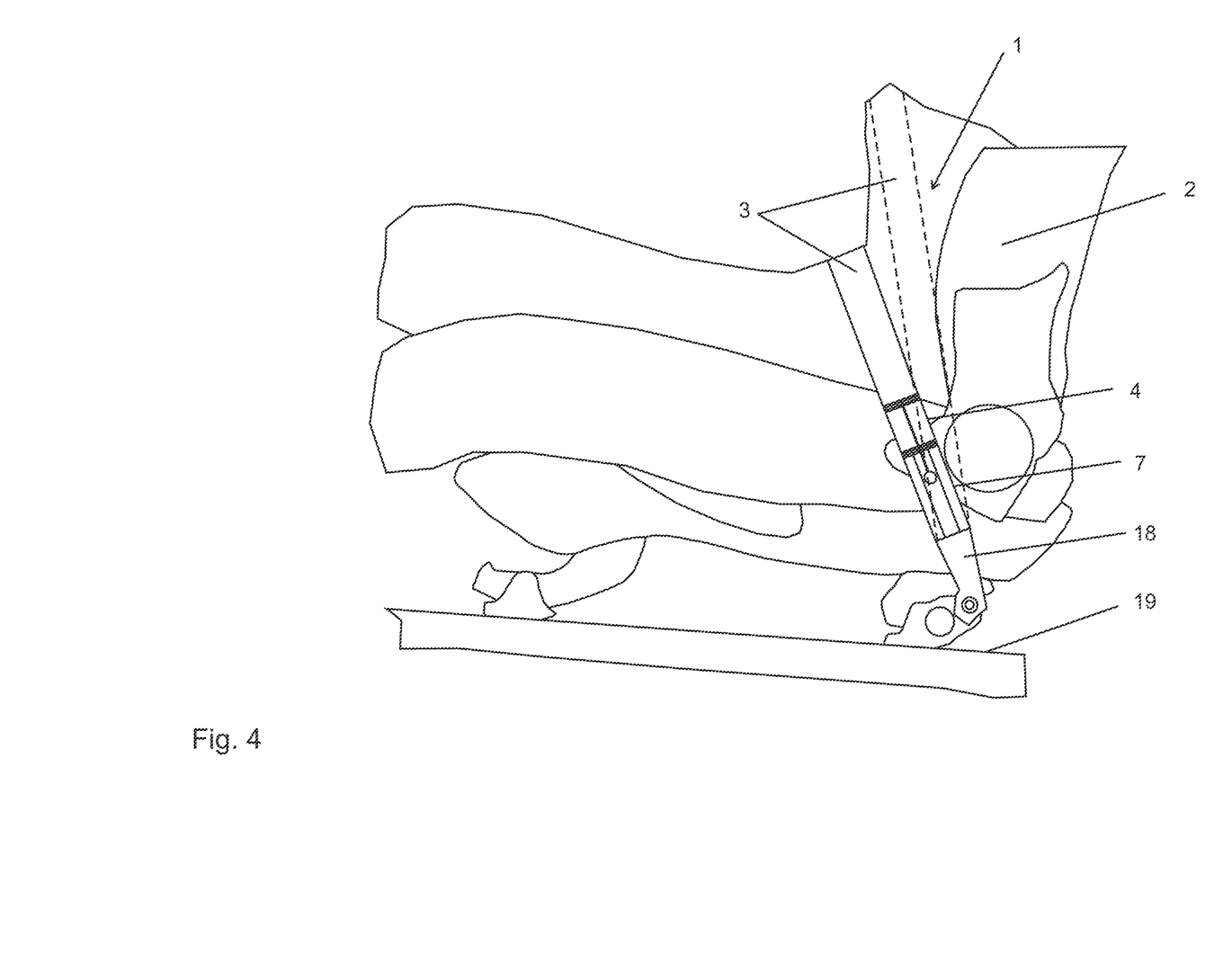
FIG. 4 is the safety belt strap of FIG. 1 which, for securing the vehicle occupant, is fixed on a vehicle seat of a motor vehicle.

The pyrotechnic tensioning device 6 comprises a chamber 7. The chamber 7 is manufactured from a double-layered safety belt material. However, to illustrate the inner region of the chamber 7, the upper of the two layers from the view of FIG. 1 is not illustrated. The marginal region 4b facing away from the retaining element 5 has a coupling element 8. One of the end regions of the chamber 7 is connected with the coupling element 8. The coupling element 8 is constructed, e.g., as a sheet metal part, on which the chamber 7 is mounted in a form-fitting and/or materially connected manner. The end region of the chamber 7 facing away from the coupling element 8 can be connected, e.g., with a belt tensioning section 3, as illustrated in FIG. 4.

The pyrotechnic tensioning device 6 has a traction device 9 and a propelling body 10, which are connected with one another. The traction device 9 is connected with the retaining element 5. In addition, the traction device 9 is guided via a guide section 11 of the coupling element 8 in the belt longitudinal direction L. The propelling body 10 is arranged movably in a guide duct 12 of the chamber 7. The guide duct 12 extends in the belt longitudinal direction L of the safety belt strap 1. To reinforce the guide duct 12 in the belt longitudinal direction L, reinforcing inserts 13 are arranged at the longitudinal sections of the chamber 7.

The pyrotechnic tensioning device 6 has an igniter with a pyrotechnic propellant charge 14, which is arranged in the coupling element 8. For the current supply of the igniter with the pyrotechnic propellant charge 14, this is connected with an ignition plug cable 15. To avoid a cable break, the ignition plug cable 15 is arranged on one of the two reinforcing inserts 13.

By the triggering of the pyrotechnic propellant charge 14, a pressure is exerted in the guide duct 12 onto the propelling body 10, so that the latter is displaced along the guide duct 12. On the displacement of the propelling body 10, the traction device 9 and consequently the marginal region 4b arranged on the traction device 9 is also moved in the belt longitudinal direction L. The additional marginal region 4b is arranged so as to be stationary in relation to the marginal region 4b arranged on the traction device 9. Therefore, the marginal region 4b, connected with the traction device 9, moves in the direction of the stationary marginal region 4b, so that a reduction of the distance A takes place between the two marginal regions 4b. By the reduction of the distance A, the belt strap section 3 is drawn in the direction of movement of the marginal region 4b connected with the traction device 9 and therefore is applied at an early stage onto the vehicle occupant. The shortening of the safety belt strap 1 in the belt longitudinal direction L is implemented in this way.

Figure 2:
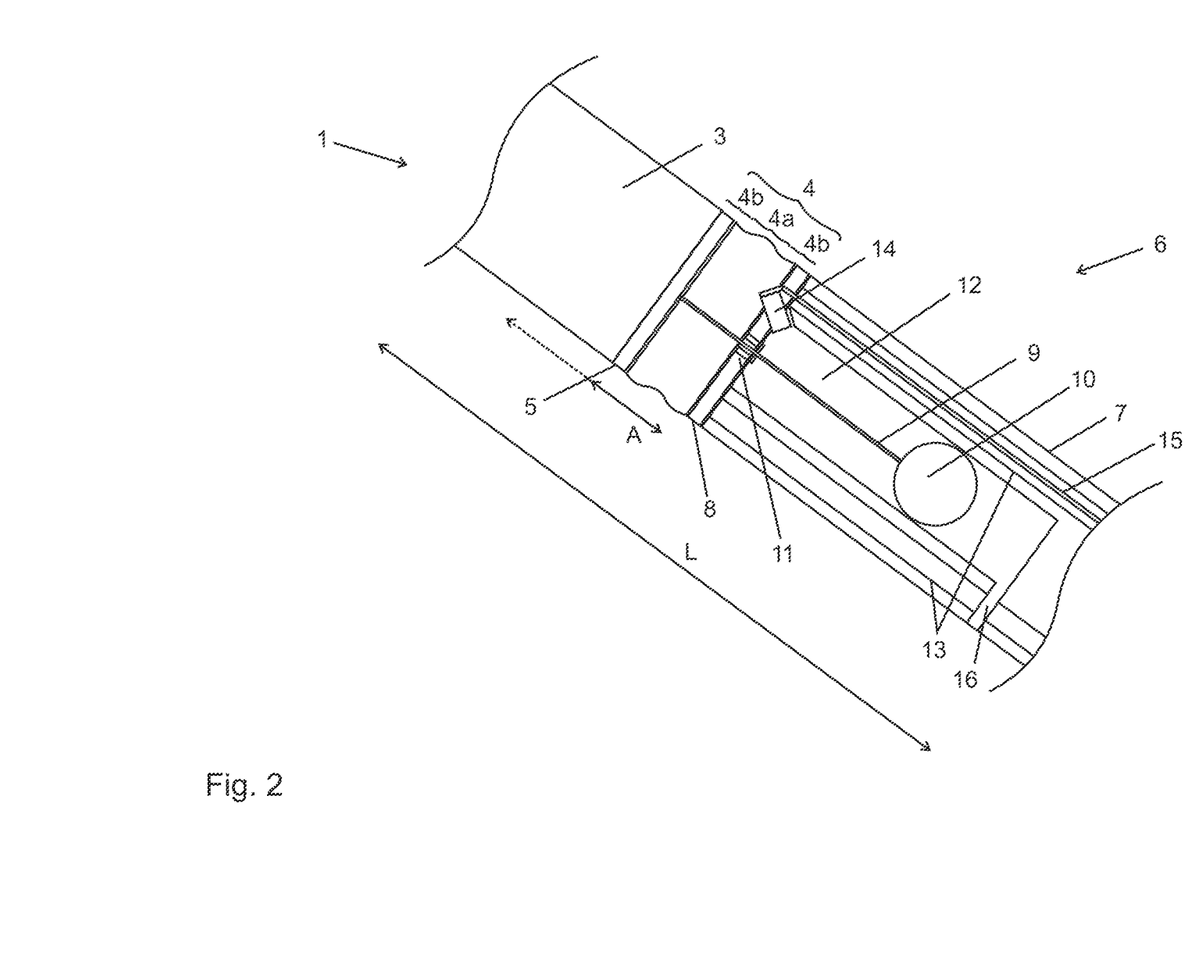
FIG. 2 is the safety belt strap of FIG. 1 that is shortened in longitudinal direction of the belt.

FIG. 2 shows the safety belt strap 1 shortened in the belt longitudinal direction L. The propelling body 10 is displaced along the guide duct 12 and the marginal region 4b, connected on the traction device 9, in the belt longitudinal direction L, wherein the distance A between the two marginal regions 4b is reduced by the displacement. Owing to the reduction of the distance A between the two marginal regions 4b, the central region 4a is not under any tensile stress and is therefore slack in its form. The shortening of the distance A of the two marginal regions 4b is delimited by the length of the central region 4a.

As can be readily seen from FIG. 1 and FIG. 2, the chamber 7 comprises an air vent 16 which is connected fluidically with the guide duct 12. The air vent 16 enables the escaping of the air which is driven off by the displaced propelling body 10. In summary, in particular the length of the central region 4a or respectively of the traction device 9 in the central region 4a defines the tensioning path which the integrated traction device 9 and the propelling body 10 cover. The central region 4a is constructed as an evading protective covering which permits the shortening, e.g., by rolling up or lateral evasion. In the central region 4a the traction device 9 transfers a tensioning force that is shielded from the surrounding fabric or an evading or respectively elastic material of the central region 4a. The central region 4a provides in particular a covering of the traction device 9, so that the central region 4a exerts no influence on the shortening. The central region 4a is therefore to be regarded as a flexible protective covering that permits the movement of the traction device 9 and protects the vehicle occupant. The central region, as the protective covering of the traction device 9, is shortened, in the case of triggering, by the movement of the traction device 9.

Figure 3:
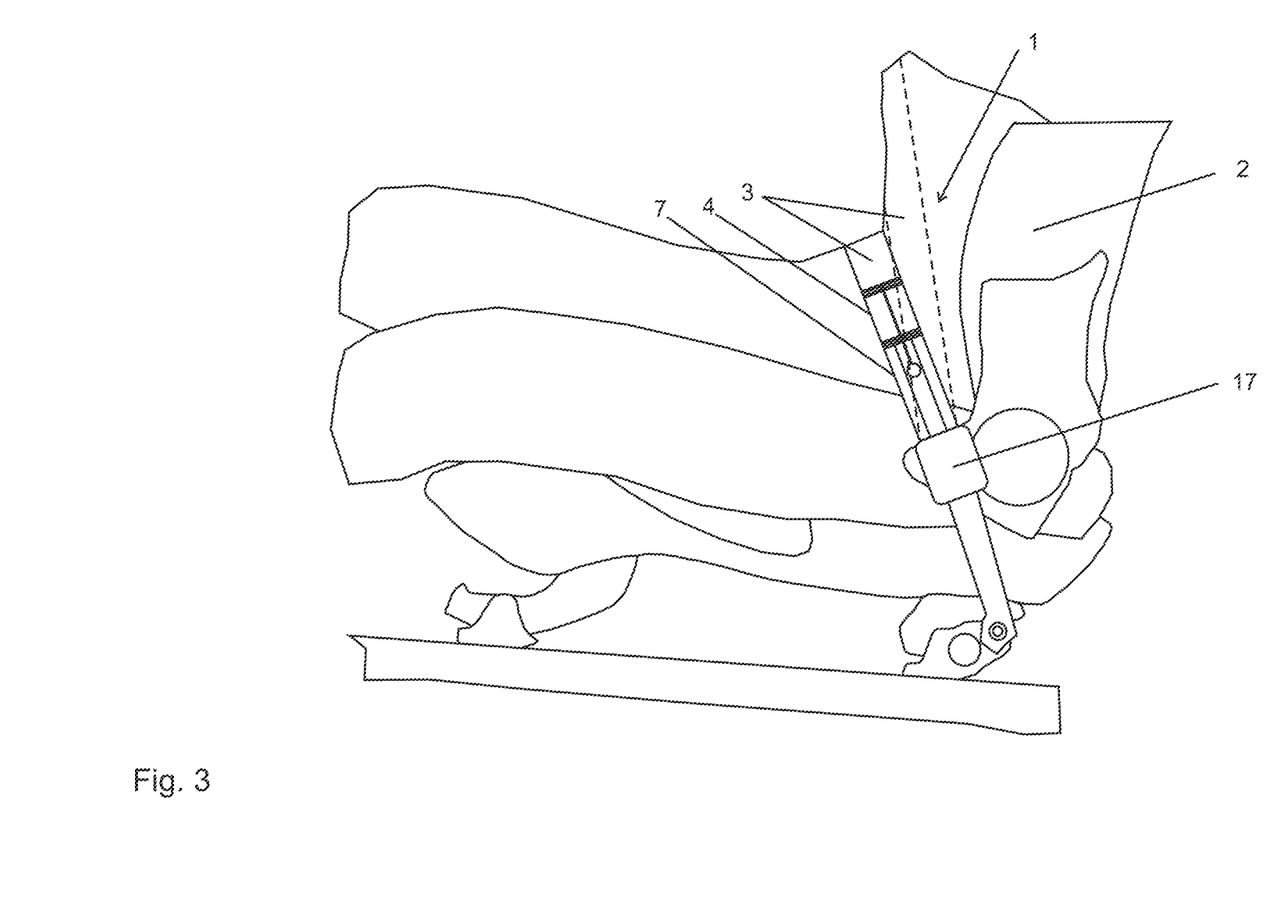
FIG. 3 is the safety belt strap of FIG. 1 which, for securing a vehicle occupant, is fixed on a belt buckle.

FIG. 3 shows a restraining of the vehicle occupant on the vehicle seat 2 by the arrangement of the safety belt strap 1 on a belt buckle 17. The safety belt strap 1 has two belt strap sections 3 and between the two belt strap sections 3 the belt tensioning section 4 and the chamber 7 with the pyrotechnic tensioning device 6. The end region of the chamber 7, facing away from the coupling element 8, is connected with one of the two belt strap sections 3. At the end region of the chamber 7 and the belt strap section 3 a fastening device 18 is arranged in the form of a belt buckle tongue, which is fastened in the belt buckle 17. However, other comparable connections to the belt buckle tongue are also possible. The belt tensioning section 4 and the pyrotechnic tensioning device 6 are arranged in the pelvic region of the vehicle occupant.

Alternatively or optionally in addition, provision can be made to arrange the belt tensioning section 4 and the pyrotechnic tensioning device 6 in the upper body region of the vehicle occupant and/or between the vehicle seat 2 and the vehicle body, e.g., at the base point of a B-column. Basically, the belt tensioning section 4 and the pyrotechnic tensioning device 6 can be used with any belt system or respectively with all vehicle seats of the motor vehicle.

FIG. 4 shows a restraining of the vehicle occupant on the vehicle seat 2 by the arrangement of the safety belt strap 1 on the vehicle seat 2 and represents a possible alternative to the example embodiment of FIG. 3. The safety belt strap 1 has the two belt strap sections 3 and between the two belt strap sections 3 the belt tensioning section 4 and the chamber 7 with the pyrotechnic tensioning device 6. The end region of the chamber 7, facing away from the coupling element 8, is connected with one of the two belt strap sections 3. At the end region of the chamber 7 and the belt strap section 3 a fastening device 18 in the form of a belt stalk is arranged which, for restraining the vehicle occupant, is fastened to a seat rail of the vehicle seat 2. By the direct arrangement of the fastening device 18 on the vehicle seat 2, the belt buckle 17 is not required. A space-saving type of construction is therefore implemented in one of the lateral regions of the vehicle seat 2. Alternatively, the fastening device 18 can be arranged, e.g., on a floor plate 19 or on a B-column base point of the motor vehicle.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A safety belt strap for arrangement on a vehicle seat of a motor vehicle, comprising:
    a belt tensioning section that is configured to shorten the safety belt strap, comprising a first marginal region, a second marginal region and a central that connects the first and second marginal regions;
    a pyrotechnic tensioning device in operative connection with the belt tensioning section such that after triggering of the pyrotechnic tensioning device the first marginal region is displaced toward the second marginal region independently of the central region in order to shorten the safety belt strap, wherein the central region is slack after triggering of the pyrotechnic tensioning device, wherein the pyrotechnic tensioning device comprises:
        a traction device that is directly coupled to first marginal region of the belt tensioning section;
        an igniter with a pyrotechnic propellant charge; and
        a propelling body coupled with the traction device, wherein after triggering of the pyrotechnic tensioning device the traction device moves the first marginal region toward the second marginal region in a longitudinal direction of the safety belt strap such that a distance between the first marginal region and the second marginal region in the longitudinal direction decreases as the first marginal region is displaced toward the second marginal region and wherein the propelling body is displaced in the longitudinal direction of the safety belt strap by the triggering of the pyrotechnic charge; and
        a chamber formed from a safety belt material, the chamber with a guide duct, and wherein after triggering of the pyrotechnic propellant charge a propellant gas is guided in the guide duct and the propelling body is displaceably arranged.

2. The safety belt strap according to claim 1, wherein the chamber has reinforcing inserts at longitudinal sections.

3. The safety belt strap according to claim 1, wherein one of the first and second marginal regions comprises:
    a coupling element, that connects the chamber and the belt tensioning section, and wherein the chamber is supported via the coupling element.

4. The safety belt strap according to claim 1, wherein one of the first and second marginal regions comprises:
   a retaining element, and wherein the belt tensioning section is connected via the retaining element with a belt strap section of the safety belt strap.

5. The safety belt strap according to claim 4, wherein a free end of the traction device is arranged on the retaining element.

6. The safety belt strap according to claim 1, wherein the safety belt strap has a fastening device that is constructed for arrangement on the vehicle seat.

7. The safety belt strap according to claim 1, wherein the safety belt strap has a fastening device that is constructed for arrangement on a B-column base point or a floor plate of the motor vehicle.

8. The safety belt strap according to claim 1, wherein the safety belt strap has a fastening device that is constructed for arrangement on a floor plate.

9. The safety belt strap according to claim 1, after triggering of the pyrotechnic tensioning device, wherein the first marginal region and the second marginal region remain under tension as the first marginal region is displaced toward the second marginal region while the central region becomes slack.

10. A safety belt strap fir arrangement on a vehicle seat of a motor vehicle, comprising:
   a belt tensioning section that is configured to shorten the safety belt strap, comprising a first marginal region, a second marginal region and a central region that connects the first and second marginal regions;
   a pyrotechnic tensioning device in operative connection with the belt tensioning section such that after triggering of the pyrotechnic tensioning device the first marginal region is displaced toward the second marginal region independently of the central region in order to shorten the safety belt strap, wherein the central region is slack after triggering of the pyrotechnic tensioning device, wherein the pyrotechnic tensioning device comprises:
      a traction device that is directly coupled to the first marginal region of the belt tensioning section;
      an igniter with a pyrotechnic propellant charge; and
      a propelling body coupled with the traction device, wherein after triggering of the pyrotechnic tensioning device the traction device moves the first marginal region toward the second marginal region in a longitudinal direction of the safety belt strap such that a distance between the first marginal region and the second marginal region in the longitudinal direction decreases as the first marginal region is displaced toward the second marginal region, and wherein the propelling body is displaced in the longitudinal direction of the safety belt strap by the triggering of the pyrotechnic propellant charge; and
      a chamber with a guide duct and having reinforcing inserts at longitudinal sections, and wherein after triggering of the pyrotechnic propellant charge a propellant gas is guided in the guide duct and the propelling body is displacedable arranged.

11. The safety belt strap according to claim 10, wherein the chamber is formed from a safety belt material.

12. The safety belt strap according to claim 10, wherein one of the first and second marginal regions comprises:
   a coupling element that connects the chamber and the belt tensioning section, and wherein the chamber is supported via the coupling element.

13. The safety belt strap according to claim 10, wherein one of the first and second marginal regions comprises:
   a retaining element, and wherein the belt tensioning section is connected via the retaining element with a belt strap section of the safety belt strap.

14. The safety belt strap according to claim 13, wherein a free end of the traction device is arranged on the retaining element.

15. The safety belt strap according to claim 10, wherein the safety belt strap has a fastening device that is constructed for arrangement on the vehicle seat.

16. The safety belt strap according to claim 10, wherein the safety belt strap has a fastening device that is constructed for arrangement on a B-column base point or a floor plate of the motor vehicle.

17. The safety belt strap according to claim 10, wherein the safety belt strap has a fastening device that is constructed for arrangement on a floor plate.

18. The safety belt strap according to claim 10, after triggering of the pyrotechnic tensioning device, wherein the first marginal region and the second marginal region remain under tension as the first marginal region is displaced toward the second marginal region while the central region becomes slack.

* * * * *